US010349167B2

(12) United States Patent
Wilk et al.

(10) Patent No.: US 10,349,167 B2
(45) Date of Patent: Jul. 9, 2019

(54) AUDIO SPEAKER WITH BACK VOLUME CONTAINING ADSORPTIVE MATERIAL

(71) Applicant: Apple Inc., Cupertino, CA (US)

(72) Inventors: Christopher Wilk, Los Gatos, CA (US); Ruchir M. Dave, San Jose, CA (US); Scott P. Porter, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/715,407

(22) Filed: May 18, 2015

(65) Prior Publication Data

US 2016/0345090 A1    Nov. 24, 2016

(51) Int. Cl.
*H04R 1/28* (2006.01)
*B01D 53/04* (2006.01)

(52) U.S. Cl.
CPC ............. *H04R 1/288* (2013.01); *B01D 53/04* (2013.01); *B01D 2253/102* (2013.01); *B01D 2253/108* (2013.01); *B01D 2259/45* (2013.01); *H04R 1/2849* (2013.01)

(58) Field of Classification Search
CPC ...... H04R 1/025; H04R 1/288; H04R 1/2849; H04R 1/2884; B01D 53/04; B01D 2253/102; B01D 2253/108; B01D 2259/45; B01D 46/0002; B01D 46/10
USPC .................................. 381/396, 400
See application file for complete search history.

(56) References Cited

U.S. PATENT DOCUMENTS

| 3,903,660 A | 9/1975 | Akins |
| 3,909,531 A | 9/1975 | Plummer |
| 4,101,736 A | 7/1978 | Czerwinski |
| 4,445,730 A | 5/1984 | Cross |
| 4,628,067 A | 12/1986 | Chen et al. |
| 4,637,990 A | 1/1987 | Torobin |
| 4,657,108 A * | 4/1987 | Ward .................. H04R 1/2803 181/149 |

(Continued)

FOREIGN PATENT DOCUMENTS

| AU | 2016289385 A1 | 1/2018 |
| CN | 1914948 A | 2/2007 |

(Continued)

OTHER PUBLICATIONS

PCT Chapter I International Preliminary Report on Patentability (IPRP Chapter I) PCT/US2016_022975 dated Nov. 21, 2017. (12 Pages).

(Continued)

*Primary Examiner* — Yogeshkumar Patel
(74) *Attorney, Agent, or Firm* — Womble Bond Dickinson (US) LLP

(57) ABSTRACT

An audio speaker having a speaker housing surrounding a back volume that is divided into a rear cavity behind a speaker driver and an adsorption cavity separated from the rear cavity by a permeable partition, is disclosed. More particularly, the adsorption cavity may be defined between the speaker housing and the permeable partition, and may be directly filled with adsorptive particles to adsorb gas during sound generation. The permeable partition may allow the gas to flow between the rear cavity and the adsorption cavity, and may retain the adsorptive particles within the adsorption cavity. Other embodiments are also described and claimed.

21 Claims, 9 Drawing Sheets

(56) References Cited

U.S. PATENT DOCUMENTS

| | | | |
|---|---|---|---|
| 5,552,035 | A | 9/1996 | Potter et al. |
| 6,210,625 | B1 | 4/2001 | Matsushita et al. |
| 6,423,658 | B1 | 7/2002 | Thonnelier et al. |
| 7,463,747 | B2 | 12/2008 | Kuze et al. |
| 7,957,541 | B2 | 6/2011 | Edgren et al. |
| 7,974,423 | B2 * | 7/2011 | Matsumura .......... H04R 1/2803 181/149 |
| 8,184,826 | B2 | 5/2012 | Matsumura et al. |
| 8,238,595 | B2 | 8/2012 | Horowitz et al. |
| 8,565,463 | B2 | 10/2013 | Saiki et al. |
| 8,649,506 | B2 | 2/2014 | Dinh et al. |
| 8,687,836 | B2 | 4/2014 | Lin |
| 8,767,998 | B2 | 7/2014 | Imamura et al. |
| 8,794,373 | B1 | 8/2014 | Lin |
| 8,848,960 | B2 | 9/2014 | Yamazaki |
| 9,099,073 | B2 | 8/2015 | Papakyriacou et al. |
| 9,615,165 | B2 | 4/2017 | Herold et al. |
| 9,635,455 | B2 | 4/2017 | Schöffmann et al. |
| 9,712,913 | B2 | 7/2017 | Lembacher et al. |
| 9,723,400 | B2 | 8/2017 | Herold et al. |
| 2007/0127760 | A1 | 6/2007 | Saiki et al. |
| 2007/0165895 | A1 * | 7/2007 | Matsumura .......... H04R 1/2803 381/351 |
| 2007/0286449 | A1 * | 12/2007 | Matsumura .......... H04R 1/2803 381/433 |
| 2008/0135327 | A1 * | 6/2008 | Matsumura .......... B61D 17/185 181/151 |
| 2008/0170737 | A1 * | 7/2008 | Saiki .................... H04R 1/2803 381/346 |
| 2009/0245562 | A1 * | 10/2009 | Saiki .................... H04R 1/2803 381/345 |
| 2011/0085690 | A1 | 4/2011 | Yamazaki |
| 2012/0027243 | A1 | 2/2012 | Imamura et al. |
| 2013/0170687 | A1 | 7/2013 | Papakyriacou et al. |
| 2013/0308812 | A1 | 11/2013 | Shen |
| 2013/0314118 | A1 | 12/2013 | Papakyriacou et al. |
| 2013/0341118 | A1 | 12/2013 | Papakyriacou et al. |
| 2014/0037119 | A1 | 2/2014 | Yuasa |
| 2014/0348349 | A1 | 11/2014 | Nagaoka |
| 2017/0013350 | A1 | 1/2017 | Sauer et al. |
| 2017/0064438 | A1 | 3/2017 | Wilk et al. |
| 2017/0208386 | A1 | 7/2017 | Yang et al. |

FOREIGN PATENT DOCUMENTS

| | | | |
|---|---|---|---|
| CN | 201063855 | Y | 5/2008 |
| CN | 106488365 | A | 3/2017 |
| CN | 107592973 | A | 1/2018 |
| CN | 108025283 | A | 5/2018 |
| DE | 112016003091 | T5 | 5/2018 |
| EP | 0197776 | A1 | 10/1986 |
| EP | 1048345 | A1 | 11/2000 |
| EP | 1 868 410 | A1 | 12/2007 |
| EP | 1868410 | A1 * | 12/2007 .......... H04R 1/2803 |
| EP | 2003924 | B1 | 4/2012 |
| FR | 2756196 | A1 | 5/1998 |
| GB | 2540160 | A | 1/2017 |
| KR | 10-2018-0054564 | A | 5/2018 |
| WO | 2003/049849 | | 6/2003 |
| WO | 2006/103404 | A1 | 10/2006 |
| WO | 2012/025874 | A1 | 3/2012 |
| WO | 2016/186717 | A1 | 11/2016 |
| WO | 2017/007644 | A1 | 1/2017 |

OTHER PUBLICATIONS

Juergen, Sauer, et al., United Kingdom Patent Office Combined Search and Examination Report (dated Jul. 26, 2016), Application No. GB1600709.8, Filed Jan. 14, 2016, 5 pages.

International Search Report and Written Opinion received for PCT Patent Application No. PCT/US2016/039911, dated Oct. 28, 2016, 15 pages.

International Search Report and Written Opinion received for PCT Patent Application No. PCT/US2016/022975, dated May 12, 2016, 15 pages.

International Preliminary Report on Patentability received for PCT Patent Application No. PCT/US2016/039911, dated Jan. 18, 2018, 12 pages.

GB application # 1408816.5, entitled "Composite material and use in a loudspeaker device", filed on May 19, 2014.

Chinese Office Action dated Dec. 21, 2018 for related Chinese Patent Appln. No. 201680027129.9 8 Pages.

* cited by examiner

B - B

D-D

D-D

AUDIO SPEAKER WITH BACK VOLUME CONTAINING ADSORPTIVE MATERIAL

BACKGROUND

Field

Embodiments related to an audio speaker having a speaker housing surrounding a back volume that is divided into several cavities by a permeable partition, are disclosed. More particularly, an embodiment related to a multi-cavity back volume within a speaker housing, the multi-cavity back volume having a cavity defined between the speaker housing and a permeable partition, and that may be filled with an adsorptive material to adsorb gas during sound generation, is disclosed.

Background Information

A portable consumer electronics device, such as a mobile phone, a tablet computer, or a portable media device, typically includes a system enclosure surrounding internal system components, such as audio speakers. Such devices may have small form factors with limited internal space, and thus, the integrated audio speakers may be micro speakers, also known as microdrivers, that are miniaturized implementations of loudspeakers having a broad frequency range. Due to their small size, micro speakers tend to have limited space available for a back volume. Furthermore, given that acoustic performance in the low frequency audio range usually correlates directly with the back volume size, micro speakers tend to have limited performance in the bass range. However, the low frequency acoustic performance of portable consumer electronics devices having micro speakers may be increased by increasing the back volume size as much as possible within the internal space available in the system enclosure.

SUMMARY

Portable consumer electronics devices, such as mobile phones, have continued to become more and more compact. As the form factor of such devices shrinks, system enclosures become smaller and the space available for speaker integration is reduced. More particularly, the space available for a speaker back volume decreases, and along with it, low frequency acoustic performance diminishes. However, as described below, the effective back volume of a portable consumer electronics device may be increased without increasing the actual physical size of the back volume. More particularly, an adsorbent material may be incorporated within the back volume to lower the frequency of the natural resonance peak and thereby make bass sounds louder. The adsorbent material may reduce the spring rate of the speaker by adsorbing and desorbing air molecules as pressure fluctuates within the back volume during sound generation. Such adsorption/desorption may increase system efficiency at lower frequencies to produce more audio power. Thus, the audio speaker may produce better sound in the same form factor, or produce equivalent sound in a smaller form factor. However, directly incorporating an adsorbent material within the back volume to improve acoustic performance may cause side effects. In particular, incorporating loose adsorbent particles directly within the back volume may create a system that is physically unbalanced and susceptible to damage as the particles shift, e.g., due to the mobile device being carried or moved by a user. Furthermore, attempting to mitigate these effects by packaging the adsorbent particles in a secondary enclosure, e.g., a mesh bag, that is then located in the back volume may cost precious enclosure space, as the secondary enclosure walls occupy vertical clearance in the back volume. Thus, for adsorbent materials to be used in a speaker back volume to enhance acoustic performance within the smallest possible form factor, an audio speaker having a speaker enclosure that physically isolates an adsorbent material from sensitive driver components without adding additional system thickness may be needed.

In an embodiment, an audio speaker includes a housing defining a back volume behind a speaker driver. The back volume may be divided into several cavities by a permeable partition that is coupled with the housing along a perimeter of the partition. More particularly, the permeable partition may divide the back volume into a rear cavity and an adsorption cavity. The rear cavity may be defined between, or enclosed by, the speaker driver, the housing, and a first side of the permeable partition. Similarly, the adsorption cavity may be defined between the housing and a second side of the permeable partition. An adsorptive filler that is to adsorb a gas may be directly loaded into the adsorption cavity. That is, the adsorptive filler directly contacts the inside of a wall of the housing and the adsorption cavity side of the permeable partition. Furthermore, the permeable partition may include one or more holes between the first side and the second side (extending through the partition from the adsorption cavity side to the other side) to place the rear cavity in fluid (gaseous) communication with the adsorption cavity, while at the same time preventing the adsorptive filler from passing from the adsorption cavity into the rear cavity. For example, each of the holes in the permeable partition may have dimensions smaller than a size of the adsorptive filler such that the adsorptive filler is retained within the adsorption cavity by the permeable partition. In an embodiment, retention of the adsorptive filler within the adsorption cavity may be further enhanced by providing a seal, e.g., a hermetic seal, between the permeable partition and the housing.

The rear cavity and the adsorption cavity of the back volume may be adjacent to each other, but may have a relative orientation that differs in various embodiments. For example, the speaker driver may include a diaphragm that moves along a central axis, and the rear cavity may be directly behind the diaphragm along the central axis. However, the adsorption cavity may be laterally offset from the rear cavity away from the central axis. That is, a normal vector emerging from the first side of the permeable partition and pointing into the rear cavity is oriented in a direction that is orthogonal to the central axis, e.g., the rear cavity and the adsorption cavity may each be flat and thin and positioned side-by-side. Alternatively, the adsorption cavity may be directly behind the rear cavity along the central axis such that the normal vector from the first side of the permeable partition points into the rear cavity in a direction parallel to the central axis.

In an embodiment, the adsorptive filler may partially, substantially, or completely fill the adsorption cavity. For example, the adsorptive filler may cover a portion of the housing within the adsorption cavity, e.g., may coat an inner surface of the housing. The adsorptive filler may include unbound particles, such as a granular composition of one or more of a zeolite material and/or an activated carbon material. The granular materials may be inserted into the adsorption cavity through a fill port extending through the housing wall between the adsorption cavity and a surrounding environment outside of the housing, and a plug may be located in the fill port to seal the adsorption cavity and prevent the adsorptive filler from passing through the fill port into the surrounding environment (and the plug may also perform as a hermetic seal to prevent gaseous flow out through the fill port).

A method of forming an audio speaker with a multi-cavity back volume includes overmolding the housing around the permeable partition. More particularly, the method may include molding the housing around the perimeter of the permeable partition such that the back volume is created with the rear cavity and the adsorption cavity placed in fluid communication through the holes in the permeable partition. The speaker driver may be mounted in a driver port, which may be integrally formed with the housing, such that the rear cavity is defined between the speaker driver, the housing, and the first side of the permeable partition. Furthermore, a fill port may be integrally formed with the housing to allow the adsorptive filler to be poured, injected, sprayed, or otherwise inserted into the adsorption cavity through the fill port. After filling the adsorption cavity with the adsorptive filler, the fill port may be sealed by a plug such that the adsorption cavity is defined between the plug, the housing, and the second side of the permeable partition. Accordingly, the audio speaker may be built with a directly filled adsorption cavity separated from a rear cavity by an acoustically transparent barrier that allows sound to drive the adsorption and desorption of air molecules within an adsorptive filler and thereby increase the overall output power of the audio speaker, especially in the low frequency audio range.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

DETAILED DESCRIPTION

Figure 1:
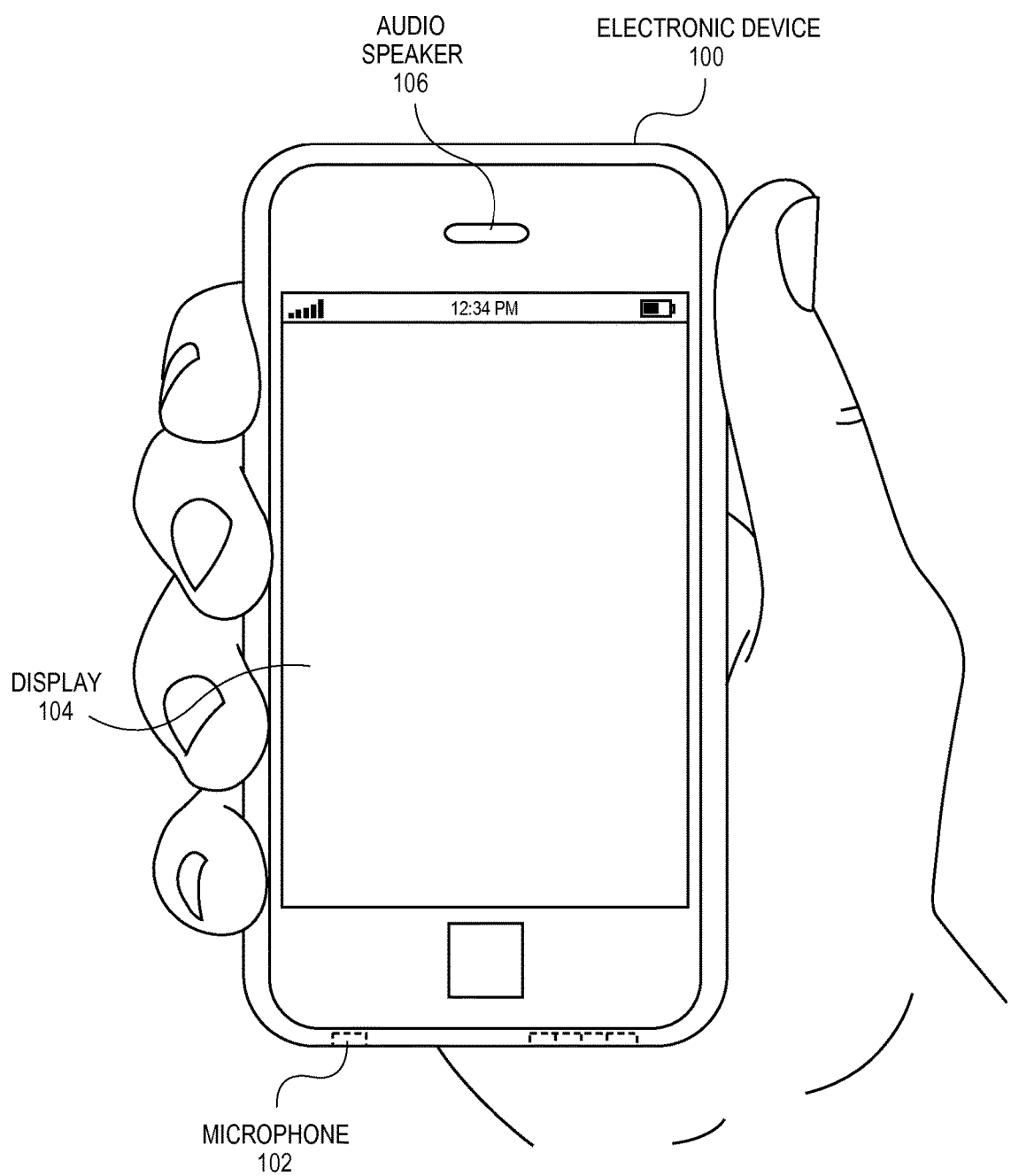
FIG. 1 is a pictorial view of an electronic device in accordance with an embodiment.

Embodiments describe an audio speaker having a speaker housing surrounding a back volume that is divided into several cavities (one of which contains an adsorbent material) by a permeable partition. However, while some embodiments are described with specific regard to integration within mobile electronics devices, such as handheld devices, the embodiments are not so limited and certain embodiments may also be applicable to other uses. For example, an audio speaker as described below may be incorporated into other devices and apparatuses, including desktop computers, laptop computers, or motor vehicles, to name only a few possible applications.

In various embodiments, description is made with reference to the figures. However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment," or the like, means that a particular feature, structure, configuration, or characteristic described is included in at least one embodiment. Thus, the appearance of the phrase "one embodiment," "an embodiment," or the like, in various places throughout this specification are not necessarily referring to the same embodiment. Furthermore, the particular features, structures, configurations, or characteristics may be combined in any suitable manner in one or more embodiments.

The use of relative terms throughout the description may denote a relative position or direction. For example, "forward" may indicate a first direction away from a reference point. Similarly, "behind" or "rear" may indicate a location in a second direction from the reference point opposite from the first direction. However, such terms are not intended to limit the use of an audio speaker to a specific configuration described in the various embodiments below. For example, a micro speaker may be oriented to radiate sound in any direction with respect to an external environment, including upward toward the sky and downward toward the ground.

In an aspect, an audio speaker may include a speaker housing that incorporates a multi-cavity back volume in a space efficient manner. The housing may at least partially define each cavity in the back volume, and the cavities may be in fluid communication with each other, i.e., air and sound may flow between the cavities. For example, a permeable partition may extend directly across the back volume such that the cavities are defined by the housing and the partition wall. The permeable partition may be supported by the housing, and in an embodiment, the permeable partition is sealed to the housing by a hermetic seal. At least one of the cavities, i.e., an "adsorption cavity," may contain an adsorbent material, such as a volume of unbound adsorbent particles, which adsorb and desorb air as pressure fluctuates in the adsorption cavity due to sound traveling between the cavities during sound generation. Thus, a multi-cavity back volume may be formed in a space efficient manner since the housing may form part of the enclosure that constrains the adsorption material, thereby eliminating a need for a secondary enclosure, e.g., a mesh bag, to constrain the adsorptive particles within the adsorption cavity.

In an aspect, an audio speaker may have a permeable partition separating an adsorption cavity, in which adsorptive filler is located, from a rear cavity, in which audio speaker components are located. The permeable partition may include holes that are large enough to permit air to flow in and out of the adsorption cavity. Thus, the permeable partition may be acoustically transparent. However, the holes may be small enough to prevent an adsorptive material from sifting outward into the rear cavity. Accordingly, the permeable partition separating the cavities may allow the adsorptive material to adsorb and desorb air molecules in response to pressure variations to lower the natural resonance peak of the audio speaker while reducing the likelihood that the adsorptive material will intrude into and damage sensitive speaker components, such as a voicecoil or a diaphragm housed in the rear cavity.

Referring to FIG. 1, a pictorial view of an electronic device is shown in accordance with an embodiment. Electronic device 100 may be a smartphone device. Alternatively, it could be any other portable or stationary device or apparatus, such as a laptop computer or a tablet computer. Electronic device 100 may include various capabilities to allow the user to access features involving, for example, calls, voicemail, music, e-mail, internet browsing, scheduling, and photos. Electronic device 100 may also include hardware to facilitate such capabilities. For example, an integrated microphone 102 may pick up the voice of a user during a call, and an audio speaker 106, e.g., a micro speaker, may deliver a far-end voice to the near-end user during the call. Audio speaker 106 may also emit sounds associated with music files played by a music player application running on electronic device 100. A display 104 may present the user with a graphical user interface to allow the user to interact with electronic device 100 and/or applications running on electronic device 100. Other conventional features are not shown but may of course be included in electronic device 100.

Figure 2:
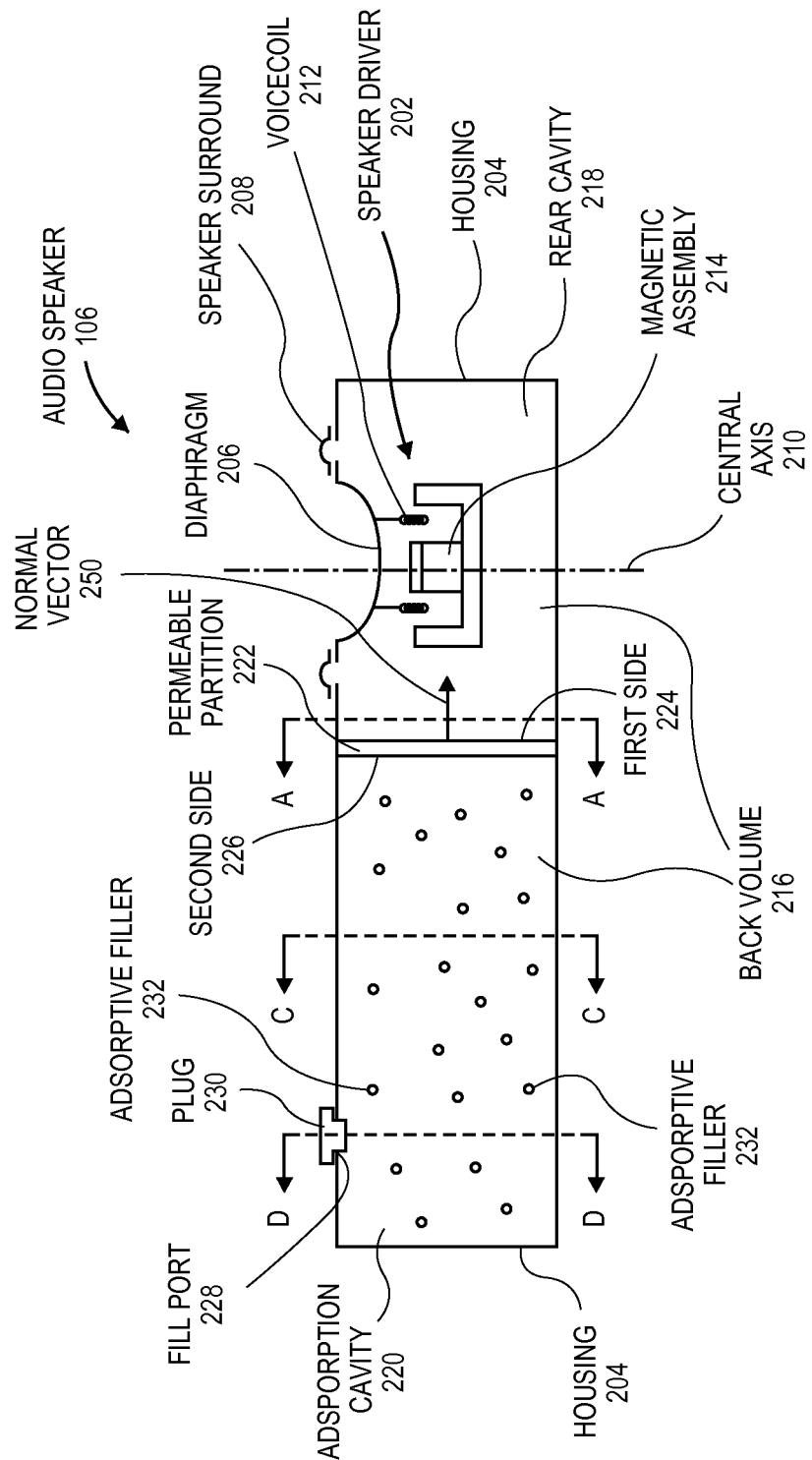
FIG. 2 is a sectional view of an audio speaker of an electronic device in accordance with an embodiment.

Referring to FIG. 2, a sectional view of an audio speaker of an electronic device is shown in accordance with an embodiment. In an embodiment, an audio speaker 106 includes an enclosure, such as a speaker housing 204, which supports a speaker driver 202. Speaker driver 202 may be a loudspeaker used to convert an electrical audio signal into a sound. For example, speaker driver 202 may be a micro speaker having a diaphragm 206 supported relative to housing 204 by a speaker surround 208. Speaker surround 208 may flex to permit axial motion of diaphragm 206 along a central axis 210. For example, speaker driver 202 may have a motor assembly attached to diaphragm 206 to move diaphragm 206 axially with pistonic motion, i.e., forward and backward, along central axis 210. The motor assembly may include a voicecoil 212 that moves relative to a magnetic assembly 214. In an embodiment, magnetic assembly 214 includes a magnet, such as a permanent magnet, attached to a top plate at a front face and to a yoke at a back face. The top plate and yoke may be formed from magnetic materials to create a magnetic circuit having a magnetic gap within which voicecoil 212 oscillates forward and backward. Thus, when the electrical audio signal is input to voicecoil 212, a mechanical force may be generated that moves diaphragm 206 to radiate sound forward along central axis 210 into a surrounding environment outside of housing 204.

Movement of diaphragm 206 to radiate sound forward toward the surrounding environment may cause sound to be pushed in a rearward direction. For example, sound may propagate through a gas filling a space enclosed by housing 204. More particularly, sound may travel through air in a back volume 216 behind diaphragm 206. Back volume 216 may influence acoustic performance. In particular, the size of back volume 216 may influence the natural resonance peak of audio speaker 106. For example, increasing the size of back volume 216 may result in the generation of louder bass sounds.

In an embodiment, back volume 216 within housing 204 may be separated into several cavities. For example, back volume 216 may be separated into a rear cavity 218 and an adsorption cavity 220 by a permeable partition 222. Rear cavity 218 may be located directly behind speaker driver 202. That is, speaker driver 202 may be suspended or supported within rear cavity 218 such that sound radiating backward from diaphragm 206 propagates directly into rear cavity 218. Accordingly, at least a portion of rear cavity 218 may be defined by a rear surface of diaphragm 206, and similarly, by a rear surface of speaker surround 208. Furthermore, given that permeable partition 222 may extend across a cross-sectional area of back volume 216 between several walls of housing 204, rear cavity 218 may be further defined by an internal surface of housing 204 and a first side 224 of permeable partition 222.

Back volume 216 may include adsorption cavity 220 separated from rear cavity 218 by permeable partition 222. That is, adsorption cavity 220 may be adjacent to rear cavity 218 on an opposite side of permeable partition 222. In an embodiment, adsorption cavity 220 is defined by an internal surface of housing 204 that surrounds back volume 216, and may also be defined by a second side 226 of permeable partition 222. Thus, rear cavity 218 and adsorption cavity 220 may be immediately adjacent to one another across permeable partition 222.

In an embodiment, adsorption cavity 220 may be placed in fluid communication with the surrounding environment through a fill port 228. For example, fill port 228 may be a hole through a wall of housing 204 that places adsorption cavity 220 in fluid communication with the surrounding environment. The port may be formed during molding of housing 204, or through a secondary operation, as described further below. To isolate adsorption cavity 220 from the surrounding environment, a plug 230 may be located in fill port 228, e.g., after filling adsorption cavity 220 with an adsorptive filler 232, to prevent leakage of the adsorptive filler 232 into the surrounding environment. Thus, adsorption cavity 220 may be partially defined by a surface of plug 230.

Audio speaker 106 may have a form factor with any number of shapes and sizes. For example, audio speaker 106, and thus housing 204, may have an external contour that appears to be a combination of hexahedrons, cylinders, etc. One such external contour could be a thin box, for example. Furthermore, housing 204 may be thin-walled, and thus, a cross-sectional area of a plane passing across housing 204 at any point may have a geometry corresponding to the external contour, including rectangular, circular, and triangular, etc. Accordingly, permeable partition 222 extending across back volume 216 within housing 204 may also have a variety of profile shapes. For example, in the case where audio speaker 106 is a hexahedron, e.g., a low-profile box having a rectangular profile extruded in a direction orthogonal to central axis 210, permeable partition 222 may have a rectangular profile.

Adsorptive filler 232 may be packaged in adsorption cavity 220 by directly filling, e.g., packing, adsorption cavity 220 with a loose adsorptive material and/or by coating inner surfaces of housing 204 with an adsorptive material. Directly filling adsorption cavity 220 may be distinguished from indirectly filling adsorption cavity 220 in that the loose adsorptive material may be poured, injected, or other transferred into adsorption cavity 220 in a loose and unconstrained manner such that the adsorptive material may move freely within adsorption cavity 220. That is, the adsorptive material may be constrained only by the walls that define adsorption cavity 220, e.g., an inner surface of housing 204, and not by a separate constraint, e.g., a bag, pouch, box, etc. that is filled with adsorptive material prior to or after inserting the separate constraint into adsorption cavity 220. Potential processes for filling adsorption cavity 220 with adsorptive material are described further below, but in an embodiment, at least a portion of the space of adsorption cavity 220 is filled with adsorptive filler 232, and at least a portion of an inner surface of housing 204 within adsorption cavity 220 is covered by adsorptive filler 232. The adsorptive filler 232 may be any appropriate adsorptive material that is capable of adsorbing a gas located in back volume 216. For example, adsorptive filler 232 may include an adsorptive material such as a zeolite, activated carbon, silica, alumina, etc., which are configured to adsorb air molecules. The adsorptive material may be in a loose granular form. More particularly, the adsorptive filler 232 may include unbound particles that are able to move freely within adsorption cavity 220, e.g., the particles may shake around during device use. Thus, permeable partition 222 may act as a barrier to prevent adsorptive filler 232 from shaking out of adsorption cavity 220 into rear cavity 218 behind speaker driver 202.

Figure 3A:
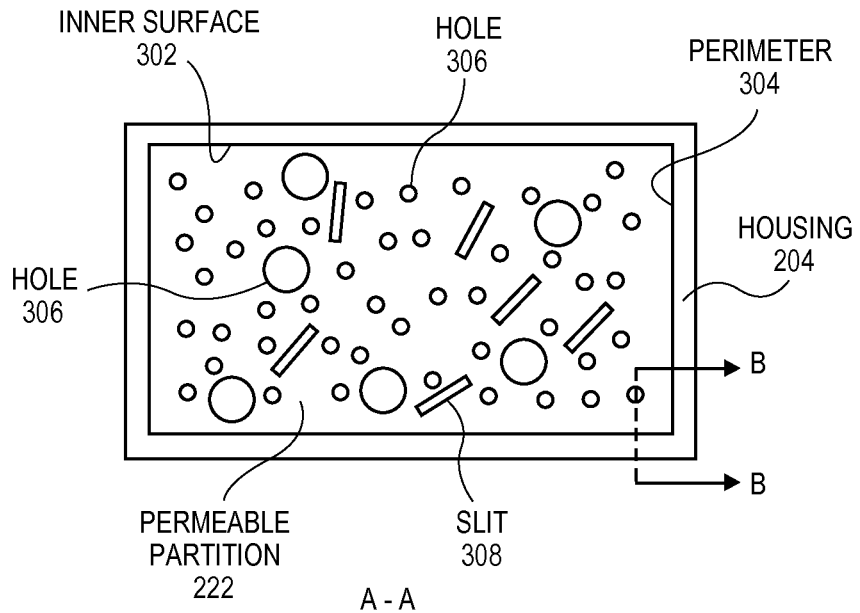
FIGS. 3A-3B are cross-sectional views, taken about line A-A of FIG. 2, of a permeable partition of an audio speaker in accordance with an embodiment.

Referring to FIG. 3A, a cross-sectional view, taken about line A-A of FIG. 2, of a permeable partition of an audio speaker is shown in accordance with an embodiment. In an embodiment, permeable partition 222 may include a film or a sheet extending across back volume 216 between opposing walls of an inner surface 302 of housing 204. For example, permeable partition 222 may be a thin plastic or metallic plate. A thickness of permeable partition 222 may be on the order of 0.1 to 5 millimeter. A perimeter 304 of permeable partition 222 may be, for example, an outer edge of first side 224 or second side 226 of permeable partition 222. Alternatively, perimeter 304 may be an outer wall extending between the sides of permeable partition 222, i.e., may be an outer rim of permeable partition 222. In any case, perimeter 304 may be coincident with inner surface 302 such that permeable partition 222 is sealed against housing 204 to prevent a gas, e.g., air, and/or adsorptive filler 232, from leaking around permeable partition 222 between adsorption cavity 220 and rear cavity 218. Inner surface 302 may provide an inner dimension of a housing wall of housing 204. More particularly, housing 204 may include a housing wall with a thickness extending from inner surface 302 adjacent to perimeter 304 of permeable partition 222 and an outer surface that provides an outer dimension of the housing wall. Thus, housing 204 may have a housing wall that forms a case or enclosure around permeable partition 222.

In an embodiment, permeable partition 222 is to allow a gas, e.g., air, to flow freely between rear cavity 218 and adsorption cavity 220 of back volume 216 through partition thickness. Permeable partition 222 may include one or more holes 306 that are larger than the constituent molecules of air, and thus allows air to flow from first side 224 to second side 226 of permeable partition 222. Thus, permeable partition 222 may be acoustically transparent, since air molecules may freely transmit pressure changes caused by sound generation. Several holes 306 of the same or different cross-section dimensions may be formed through permeable partition 222. For example, permeable partition 222 may include a first set of several circular holes 306 with diameters on the order of 5 nanometer to 100 micrometer, and a second set of holes or slots, e.g., transverse slits 308, having widths on the order of 5 nanometer to 100 micrometer and lengths on the order of 5 nanometer to 500 micrometer. These hole shapes and dimensions are provided by way of example only, and may be varied within the scope of this description to provide passages through which air may pass from rear cavity 218 to adsorption cavity 220 to create an acoustically transparent permeable partition 222.

Figure 3B:
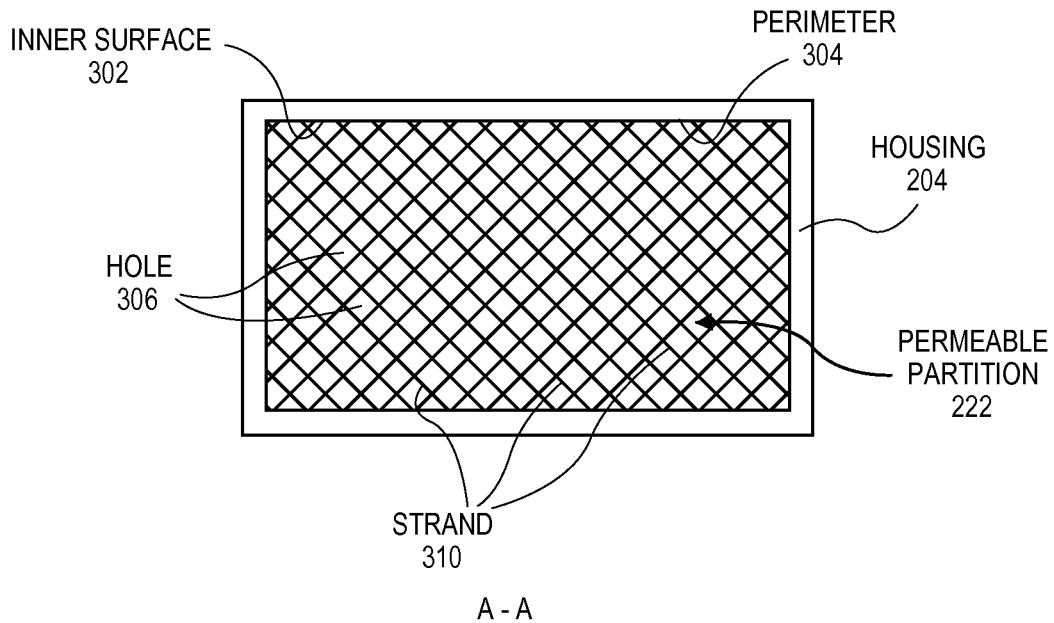

Referring to FIG. 3B, a cross-sectional view, taken about line A-A of FIG. 2, of a permeable partition of an audio speaker is shown in accordance with an embodiment. In an embodiment, permeable partition 222 includes a mesh structure extending across back volume 216 from perimeter 304 at inner surface 302 of housing 204. The mesh structure may include several strands 310 of flexible material, e.g., plastic or metal strands 310, which are woven, knitted, etc., to form a web-like structure with holes 306 between strands 310. As an example, permeable partition 222 may be a polyester mesh. Other processes, such as expanding plastic sheeting to produce a porous sheet, may also be used to form permeable partition 222 with acoustically transparent passages. The pitch and spacing between strands 310 may be selected and formed to create holes 306 having dimensions that allow air to flow across permeable partition 222 between rear cavity 218 and adsorption cavity 220. The dimension of strands 310 may be selected accordingly. For example, mesh strands 310 may have a diameter on the order of 0.1 to 5 mm.

In an embodiment, the holes 306 in permeable partition 222 are sized to prevent adsorptive filler 232 from escaping adsorption cavity 220 through the partition. For example, holes 306 and/or slits 308 of permeable partition 222 may include dimensions that are smaller than a maximum dimension of adsorptive filler 232 particles. In an embodiment, adsorptive filler 232 includes particles having outer dimensions on the order of 10 nanometer to 500 micrometer. Thus, depending on the size range of adsorptive filler 232 particles that are used to fill adsorption cavity 220, permeable partition 222 may include holes 306 on the order of 9 nanometer to 499 nanometer. In an example, if the outer dimension of adsorptive filler 232 particles in adsorption cavity 220 range between 50 to 150 micrometer, then holes 306 and/or slits 308 may have a maximum dimension of less than 50 micrometer, e.g., 40 micrometer, to retain even the smallest particles in adsorption cavity 220.

Figure 4:
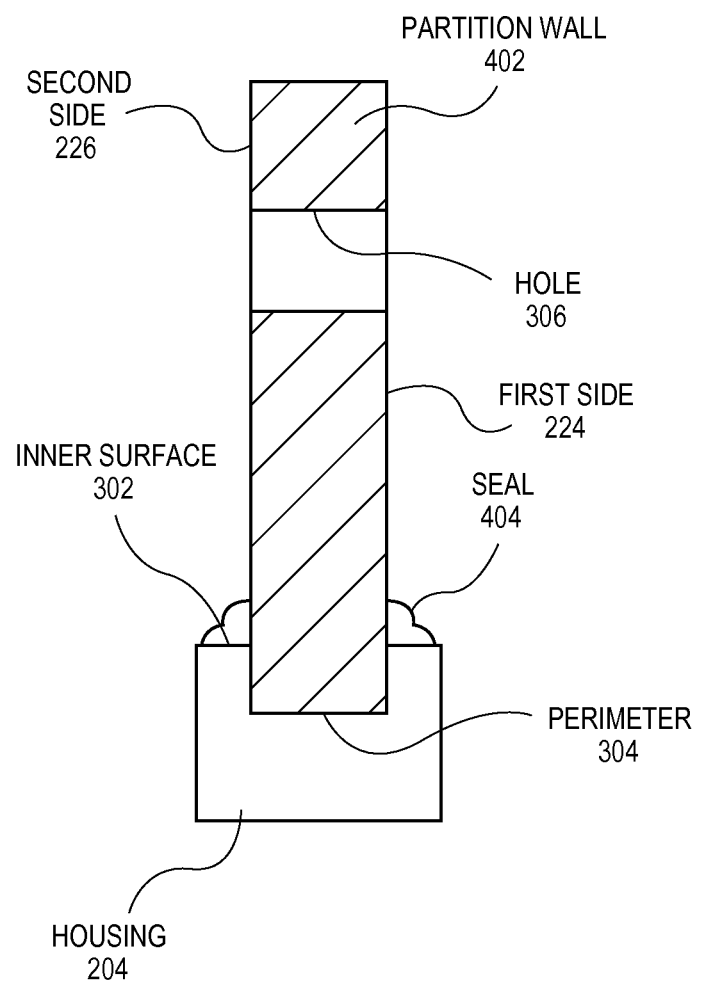
FIG. 4 is a cross-sectional view, taken about line B-B of FIG. 3A, of a sealed portion of an audio speaker in accordance with an embodiment.

Referring to FIG. 4, a cross-sectional view, taken about line B-B of FIG. 3A, of a sealed portion of an audio speaker is shown in accordance with an embodiment. Permeable partition 222 may be sealed along perimeter 304 to prevent escape of adsorptive filler 232 around an outer edge of permeable partition 222 into rear cavity 218. More particularly, partition wall 402 may engage a slot formed in an inner surface 302 of housing 204 such that the surface of the slot overlaps a portion of first side 224 or second side 226. The overlap of permeable partition 222 and housing 204 may be sufficient to prevent adsorptive filler 232 from escaping adsorption cavity 220. For example, the slot in housing 204 and overlap between permeable partition 222 and housing 204 may be formed by overmolding housing 204 around permeable partition 222. In such case, permeable partition 222 may be joined to housing 204 along the overmolded surfaces such that a seal is formed to resist movement of adsorptive filler 232 around permeable partition 222. The joint may have gaps that range in dimension from zero to the smallest particle dimension of adsorptive filler 232. When the gap is essentially zero, the joint may form a hermetic seal.

Optionally, the barrier between adsorption cavity 220 and rear cavity 218, and more particularly the joint between perimeter 304 and housing 204, may be enhanced by forming a seal 404 at the interface between housing 204 and permeable partition 222. For example, a bead of adhesive or epoxy, e.g., silicone, may be applied at the interface to form a hermetic seal that prevents the migration of both adsorptive filler 232 and air around the outer edge of permeable partition 222. Thus, seal 404 may be applied on one or both of first side 224 or second side 226 of permeable partition 222 to form an airtight seal between permeable partition 222 and housing 204.

A hermetic seal may be formed with or without a separate seal 404 at the interface between housing 204 and permeable partition 222. That is, when the gap between housing 204 and permeable partition 222 is essentially zero, the joint may form a hermetic seal that ensures that sound airflow (due to the speaker driver in operation) does not pass around perimeter 304 of partition wall 402, and is instead confined to the predetermined holes 306 in partition wall 402. However, the addition of separate seal 404, e.g., a bead of sealant, may assist in forming the hermetic seal, and furthermore, may provide a mechanical bond between housing 204 and partition wall 402 to secure the components relative to each other.

Figure 5A:
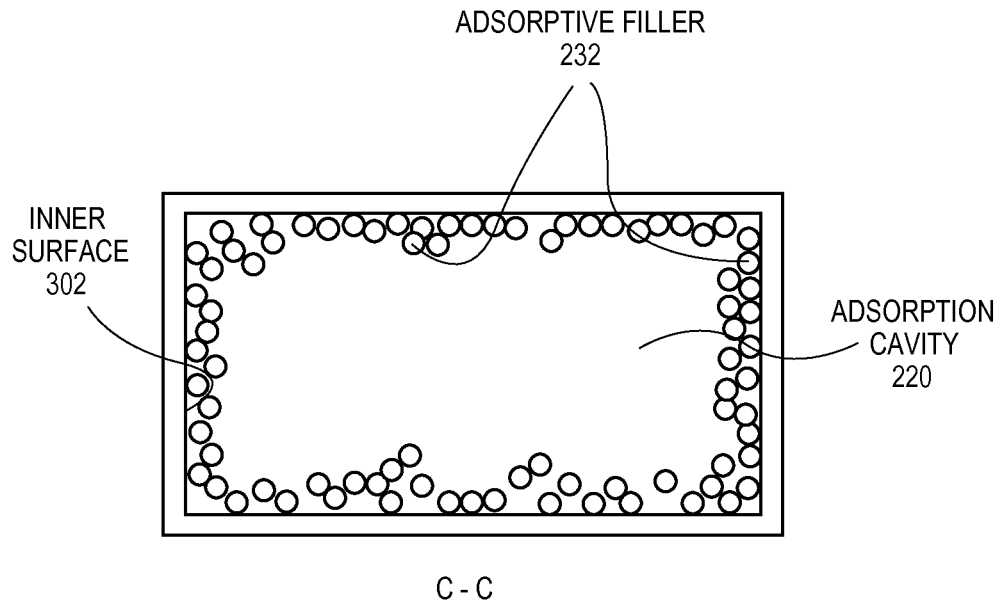
FIGS. 5A-5B are cross-sectional views, taken about line C-C of FIG. 2, of an adsorption cavity of an audio speaker in accordance with an embodiment.

Referring to FIG. 5A, a cross-sectional view, taken about line C-C of FIG. 2, of an adsorption cavity of an audio speaker is shown in accordance with an embodiment. As described above, adsorption cavity 220 may include adsorptive filler 232, which may include any combination of adsorptive materials, including activated carbon and zeolite materials. Adsorptive filler 232 may be in a particulate form, e.g., granular powder, and thus may move freely within adsorption cavity 220 and directly contact surfaces of permeable partition 222 and housing 204. As shown in FIG. 5A, adsorptive filler 232 may partially fill adsorption cavity 220, i.e., the total volume of adsorptive filler 232 may be less than the volume of adsorption cavity 220. This may be the case, for example, when a layer of adsorptive filler 232 is coated over inner surface 302 using known coating techniques.

In an embodiment, adsorptive filler 232 may cover at least a portion of inner surface 302. For example, gravity may cause adsorptive filler 232 particles to settle to a bottom side of adsorption cavity 220 and the particles may cover the bottom inner surface 302 of housing 204 within adsorption cavity 220. In an alternative embodiment, at least a portion of the adsorptive filler 232 particles may adhere to inner surface 302 through native surface adhesion, or through the addition of an adhesive therebetween. For example, adsorptive filler 232 particles may be coated over an adhesive layer on inner surface 302 such that the particles adhere around a periphery of adsorption cavity 220, as shown in FIG. 5A. That is, particles may at least partially cover several internal walls of adsorption cavity 220. Thus, adsorptive filler 232 may cover inner surface 302 around adsorption cavity 220.

Figure 5B:
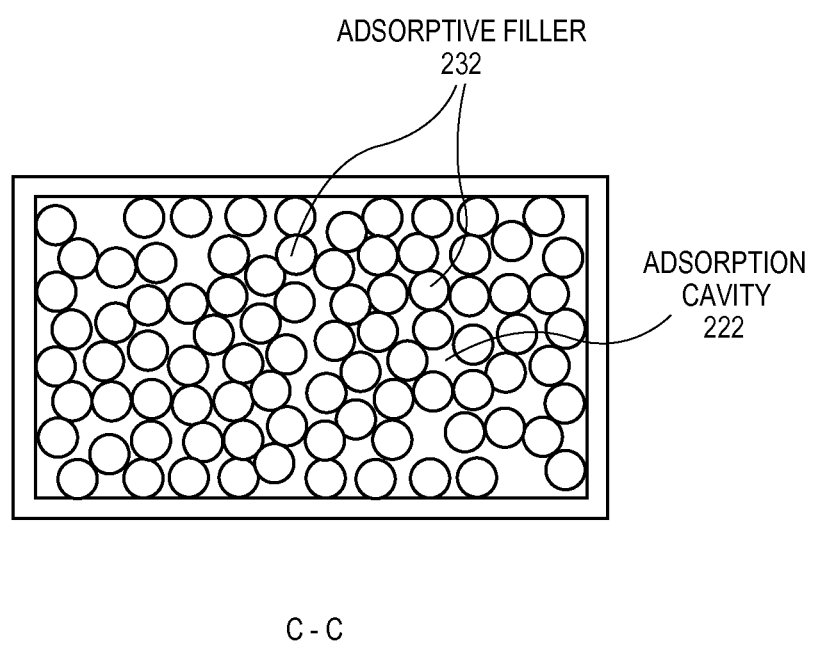

Referring to FIG. 5B, a cross-sectional view, taken about line C-C of FIG. 2, of an adsorption cavity of an audio speaker is shown in accordance with an embodiment. In an embodiment, adsorptive filler 232 substantially or completely fills adsorption cavity 220. For example, adsorptive filler 232 may be packed into adsorption cavity 220 such that at least 50% of the volume of adsorption cavity 220 is filled by the packed particulate volume. This packing volume may include the spaces between the particles. For example, a volume of the particulate matter and a volume of the interstitial spaces between particles may be at least 75% of the volume of adsorption cavity 220, and in some cases at least 90% of the volume of adsorption cavity 220. In an embodiment, none of the volume of adsorptive cavity 220 is occupied by secondary containers, such as mesh bag walls or films, surrounding adsorptive filler 232.

Figure 6A:
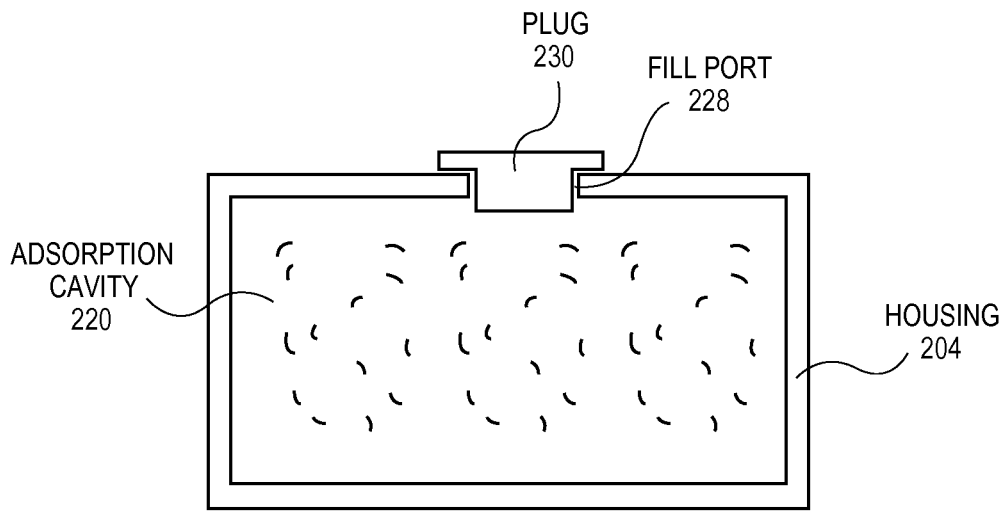
FIGS. 6A-6B are cross-sectional views, taken about line D-D of FIG. 2, of a plugged portion of an audio speaker in accordance with an embodiment.

Referring to FIG. 6A, a cross-sectional view, taken about line D-D of FIG. 2, of a plugged portion of an audio speaker is shown in accordance with an embodiment. In an embodiment, housing 204 includes plug 230 disposed within fill port 228 to prevent adsorptive filler 232 from leaking out of adsorption cavity 220. For example, plug 230 may be shaped to engage fill port 228 such that a surface of plug 230 forms a press fit against a surface of fill port 228 to create a stopper that seals adsorption cavity 220. Plug 230 may also be welded, e.g., chemically or thermally, to housing 204 within fill port 228 to form a permanently sealed plug.

Figure 6B:
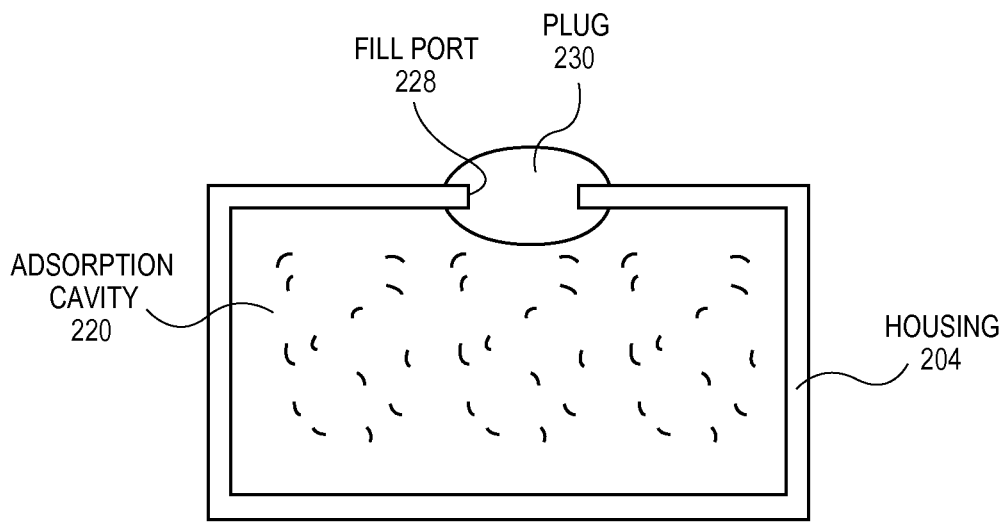

Referring to FIG. 6B, a cross-sectional view, taken about line D-D of FIG. 2, of a plugged portion of an audio speaker is shown in accordance with an embodiment. In an embodiment, plug 230 may have a grommet shape with a central body and upper and lower collars that seal against an inner surface 302 and an outer surface of housing 204. The central body may seal against housing 204 within fill port 228. The grommet plug may be formed prior to insertion within fill port 228. Alternatively, plug 230 may be formed from an adhesive, e.g., a temperature or light-cured adhesive, an epoxy, or a molten plastic or metal that is flowed into fill port 228 and thereafter cured or cooled such that plug 230 hardens in place to create a permanently sealed plug 230 to seal adsorption cavity 220.

Figure 7:
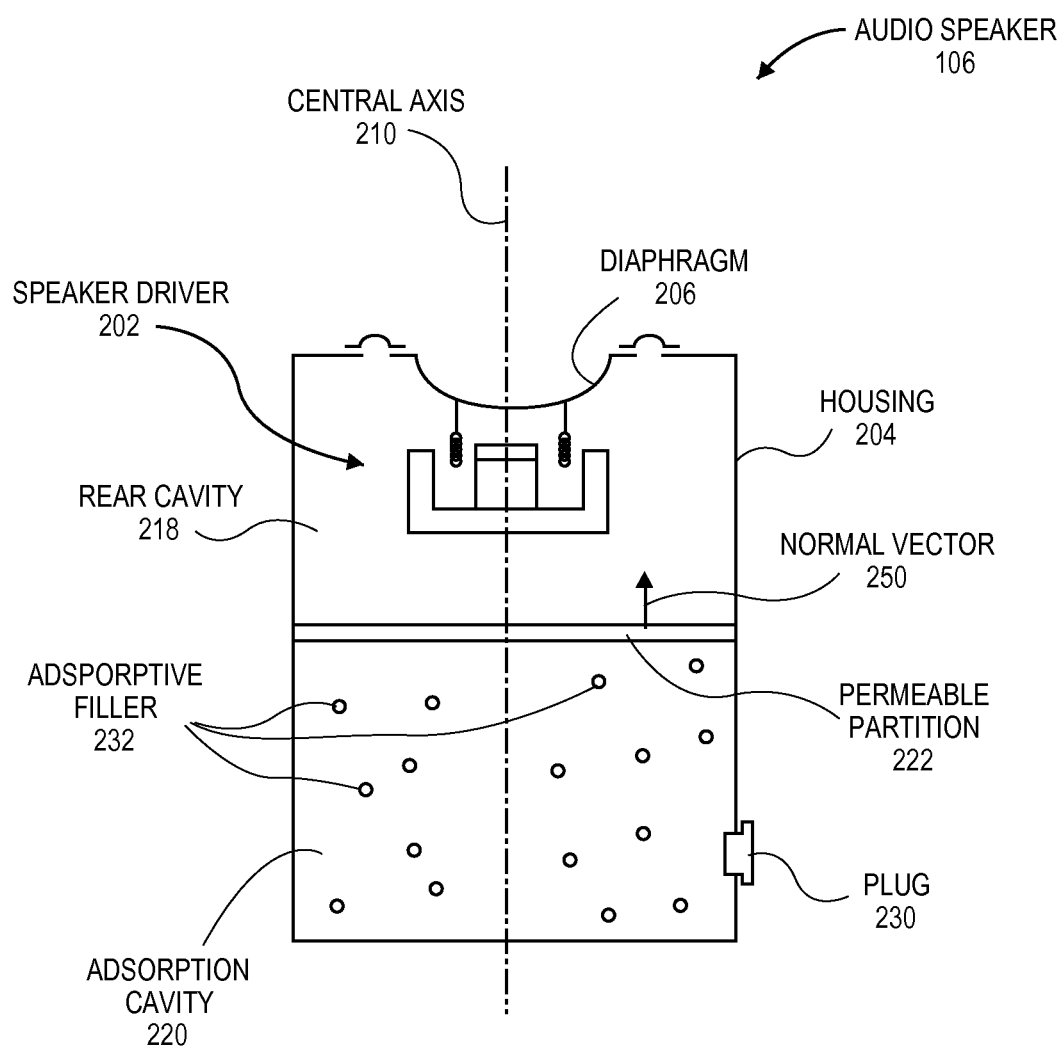
FIG. 7 is a sectional view of an audio speaker of an electronic device in accordance with an embodiment.

Referring to FIG. 7, a sectional view of an audio speaker of an electronic device is shown in accordance with an embodiment. Rear cavity 218 and adsorption cavity 220 may have different relative orientations in various embodiments. For example, as shown in FIG. 2, in an embodiment, adsorption cavity 220 is located lateral to rear cavity 218, i.e., is laterally offset from rear cavity 218 away from central axis 210. That is, permeable partition 222 may cross back volume 216 along a plane such that a normal vector 250 emerging from first side 224 and pointing into a rear cavity 218 is oriented in a direction orthogonal to central axis 210. For example, rear cavity 218 and adsorption cavity 220 may each be flat and thin and positioned side-by-side. As a result, sound emitted rearward from diaphragm 206 may propagate directly toward a rear wall of rear cavity 218, rather than be radiated directly toward permeable partition 222.

In an embodiment, audio speaker 106 includes axially arranged back volume 216 cavities. For example, adsorption cavity 220 may be located directly behind rear cavity 218. That is, central axis 210 may intersect rear cavity 218 behind diaphragm 206 and adsorption cavity 220 on an opposite side of permeable partition 222. Accordingly, permeable partition 222 may cross back volume 216 along a plane such that normal vector 250 emerging from first side 224 and pointing into rear cavity 218 is oriented in a direction that is parallel to central axis 210. For example, rear cavity 218 and adsorption cavity 220 may each be flat and thin and positioned forward-and-behind along central axis. Thus, sound emitted rearward by diaphragm 206 may propagate along central axis 210 directly through rear cavity 218 and permeable partition 222 into adsorption cavity 220.

Permeable partition 222 may be oriented at any angle relative to central axis 210. That is, although first face may face a direction orthogonal to, or parallel to, central axis 210, in an embodiment, permeable partition 222 is oriented at an oblique angle relative to central axis 210. Thus, adsorption cavity 220 may be some combination of lateral to, or directly behind, adsorption cavity 220 within the scope of this description. In any case, rear cavity 218 and adsorption cavity 220 may be adjacent to one another such that opposite sides of permeable partition 222 define a portion of each cavity.

Figure 8:
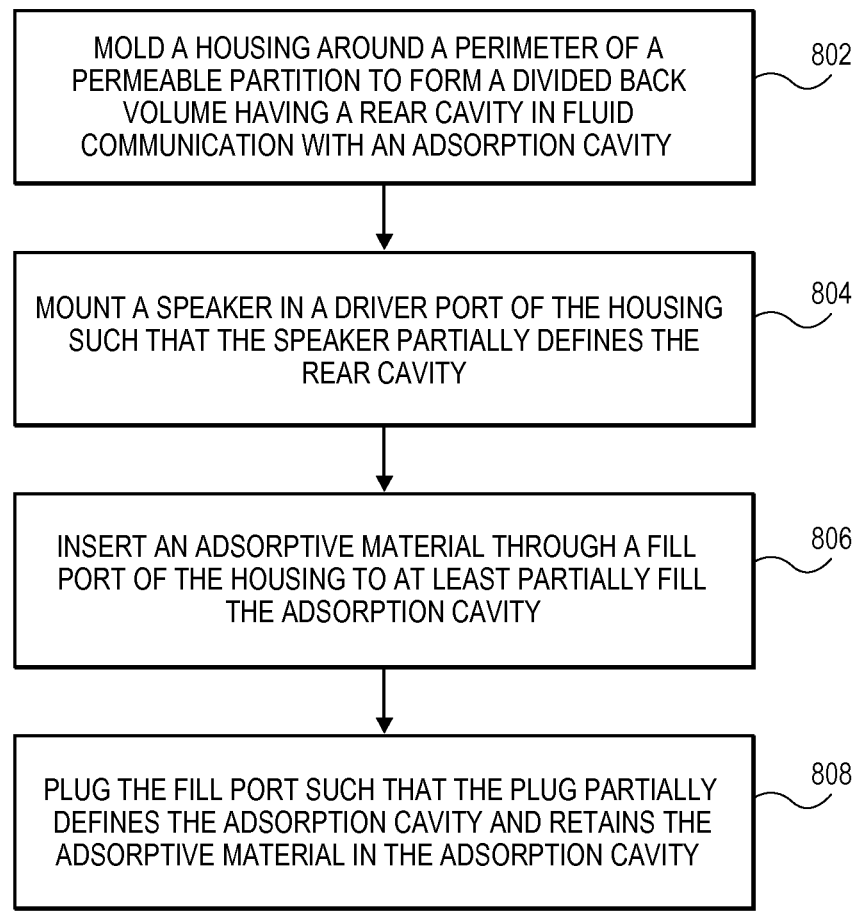
FIG. 8 is a flowchart of a method of forming an audio speaker having a multi-cavity back volume in accordance with an embodiment.

Referring to FIG. 8, a flowchart of a method of forming an audio speaker having a multi-cavity back volume is shown in accordance with an embodiment. At operation 802, housing 204 may be overmolded around permeable partition 222. For example, permeable partition 222 may be a thin-walled sheet, plate, or mesh having the structure described above, and may be loaded into an injection mold before molding housing 204 around perimeter 304 of permeable partition 222. The overmolded enclosure may include housing 204 with a multi-cavity back volume 216 defined on either side of permeable partition 222. In particular, permeable partition 222 may separate rear cavity 218 on first side 224 from adsorption cavity 220 on second side 226, and a seal, e.g., a hermetic seal, may be formed around perimeter 304 due to an overlap between housing 204 and partition wall 402. Thus, housing 204 may include rear cavity 218 separate from, and in fluid communication with, adsorption cavity 220 through holes 306 of permeable partition 222. Furthermore, the cavities of back volume 216 may be formed directly between the surfaces of housing 204 and permeable partition 222.

At operation 804, speaker driver 202 and/or other audio components may be mounted in audio speaker 106. For example, diaphragm 206 and/or speaker surround 208 may be mounted within a speaker port formed in housing 204. The speaker port may be a circular port that speaker surround 208 is sealed against to support diaphragm 206, for example. The speaker port may be formed during the molding process, e.g., the injection mold may include geometry that defines speaker port. Alternatively, the speaker port may be formed in a secondary operation, e.g., by drilling or milling a port of the desired size and geometry through a wall of housing 204 that encloses rear cavity 218. Thus, speaker driver 202 may partially define rear cavity 218 of back volume 216. For example, with speaker surround 208 mounted around the speaker port, a rear surface of diaphragm 206 may define a portion of the enclosure around rear cavity 218.

At operation 806, adsorptive material may be loaded into adsorption cavity 220. In an embodiment, fill port 228 is formed through housing 204. For example, fill port 228 may be formed during the molding process, e.g., the injection mold may include geometry that defines fill port 228. Alternatively, fill port 228 may be formed in a secondary operation, e.g., by drilling or milling a port of the desired size and geometry through a wall of housing 204 that encloses adsorption cavity 220. After forming fill port 228, adsorptive filler 232 may be inserted through fill port 228 to at least partially fill adsorption cavity 220. For example, adsorptive filler 232 in the form of a powder or other granular material may be poured into adsorption cavity 220 through fill port 228. As described above, adsorptive filler 232 may partially, substantially, or completely fill adsorption cavity 220. For example, the adsorptive particulate (including interstitial spaces between particles) may have a volume that is at least 95% of the volume of adsorption cavity 220, and in some cases more than 98% of the volume of adsorption cavity 220.

In an embodiment, inserting adsorptive filler 232 may involve injecting a combination of adsorptive material and adhesive material such that the adsorptive filler 232 adheres to inner surface 302 of housing 204 around adsorption cavity 220. The combination of adhesive and granules may be injected, for example, through a pressurized delivery nozzle that is inserted through fill port 228 and then directed toward inner surface 302 to spray the adsorptive composition against the cavity wall. Thus, inserting adsorptive filler 232 into adsorption cavity 220 may include coating a portion of inner surface 302 of housing 204 around adsorption cavity 220 with adsorptive filler 232.

At operation 808, fill port 228 may be sealed to enclose adsorption cavity 220. For example, plug 230 may be press fit into fill port 228, or alternatively, plug 230 may be flowed and cured within fill port 228 to seal fill port 228 against the escape of air and/or adsorptive filler 232 from adsorption cavity 220. As a result, plug 230 may partially define adsorption cavity 220, along with inner surface 302 of housing 204 and second side 226 of permeable partition 222. Accordingly, adsorption cavity 220 may be fully enclosed to prevent the escape of adsorptive filler 232.

Figure 9:
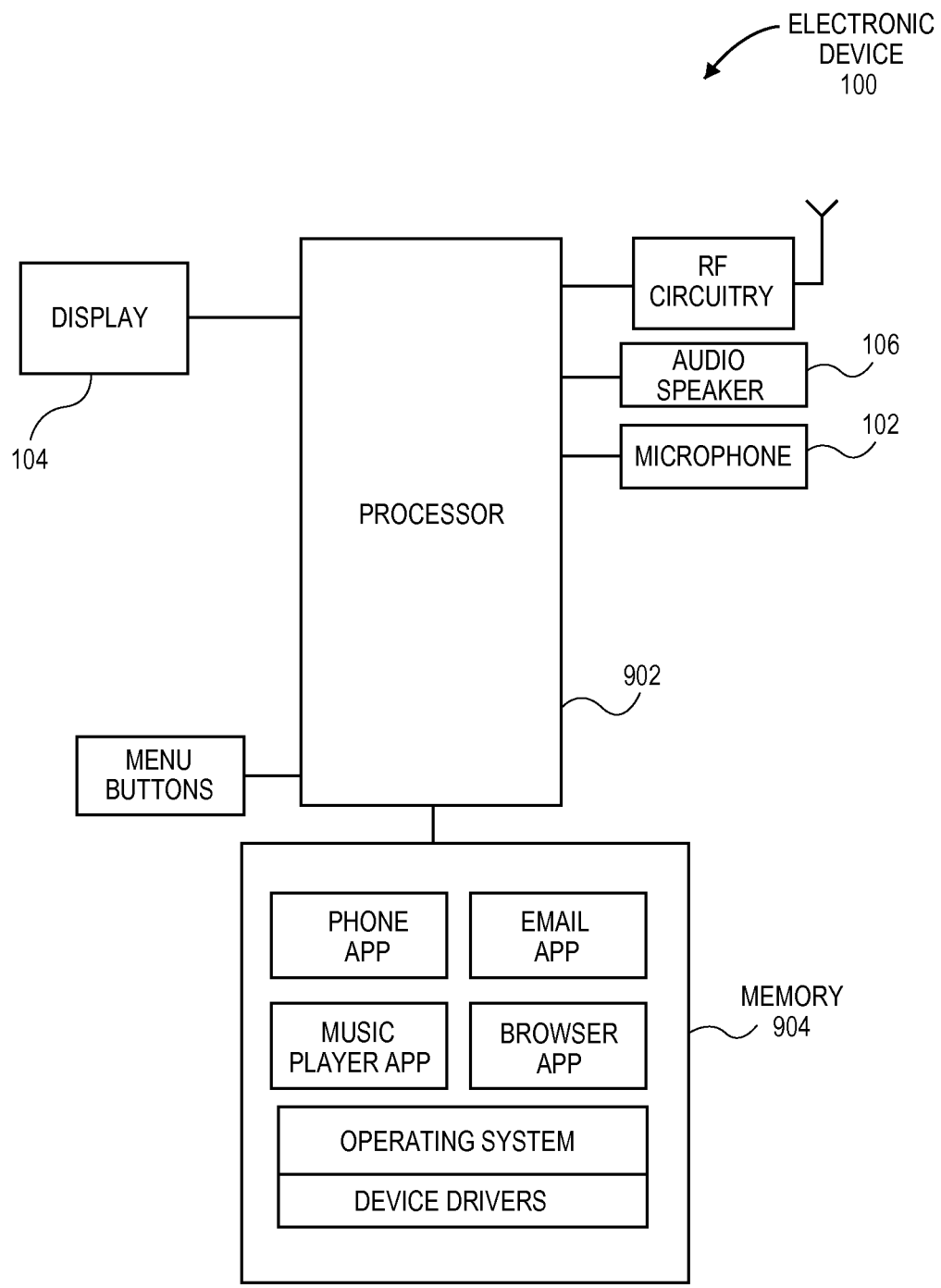
FIG. 9 is a schematic view of an electronic device having a micro speaker in accordance with an embodiment.

Referring to FIG. 9, a schematic view of an electronic device having a micro speaker is shown in accordance with an embodiment. As described above, electronic device 100 may be one of several types of portable or stationary devices or apparatuses with circuitry suited to specific functionality. Thus, the diagrammed circuitry is provided by way of example and not limitation. Electronic device 100 may include one or more processors 902 that execute instructions to carry out the different functions and capabilities described above. Instructions executed by the one or more processors 902 of electronic device 100 may be retrieved from local memory 904, and may be in the form of an operating system program having device drivers, as well as one or more application programs that run on top of the operating system, to perform the different functions introduced above, e.g., phone or telephony and/or music play back. For example, processor 902 may directly or indirectly implement control loops and provide drive signals to voicecoil 212 of audio speaker 106 to drive diaphragm 206 motion and generate sound.

Audio speaker 106 having the structure described above may include back volume 216 separated by an acoustically transparent barrier, e.g., permeable partition 222, into two cavities: rear cavity 218 directly behind speaker driver 202 and adsorption cavity 220 adjacent to rear cavity 218 across permeable partition 222. Furthermore, adsorption cavity 220 may be directly filled with an adsorptive material such that back volume 216 includes an adsorptive volume defined directly between a system housing 204 and the acoustically transparent barrier. The adsorptive volume may reduce the overall spring rate of back volume 216 and lower the natural resonance peak of audio speaker 106. That is, adsorptive filler 232 may adsorb and desorb randomly traveling air molecules as pressure fluctuates within back volume 216 in response to a propagating sound. As a result, audio speaker 106 may have a higher efficiency at lower frequencies, as compared to a speaker having a back volume 216 without adsorptive material. Thus, the overall output power of audio speaker 106 may be improved. More particularly, audio speaker output, e.g., during telephony or music play back, may be louder, especially within the low frequency audio range. Accordingly, audio speaker 106 having the structure described above may produce louder, richer sound within the bass range using the same form factor as a speaker back volume without multiple cavities, or may produce equivalent sound within the bass range within a smaller form factor. Furthermore, since adsorption cavity 220 is defined directly between housing 204 and permeable partition 222, which are sealed together, the form factor of audio speaker 106 may be smaller than, e.g., a speaker back volume that holds a secondary container, e.g., a mesh bag, filled with an adsorbent material.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An audio speaker, comprising:
a housing defining a back volume behind a speaker driver, wherein the speaker driver is to convert an electrical audio signal into a sound, the sound to propagate through a gas in the back volume;
a permeable partition having an outer edge, wherein the outer edge is sealed to the housing to divide the back volume into a rear cavity defined between the speaker driver, the housing, and the permeable partition and an adsorption cavity defined between the housing and the permeable partition, wherein the permeable partition includes a plurality of holes that allow sound to propagate directly between the rear cavity and the adsorption cavity, and wherein the plurality of holes have respective hole dimensions;
an adsorptive filler in the adsorption cavity to adsorb the gas, wherein the adsorptive filler includes granules having respective outer dimensions greater than the respective hole dimensions such that the permeable partition constrains the granules within the adsorption cavity, and wherein the granules are movable against the permeable partition and the housing within the adsorption cavity;
a fill port configured to fill the adsorption cavity with the adsorptive filler, the fill port including a hole extending through the housing between the adsorption cavity and a surrounding environment; and
a plug in the fill port, wherein the plug includes a plug shape to form a press fit between a surface of the plug and the housing within the hole of the fill port to create a stopper that seals the adsorption cavity to prevent the adsorptive filler from passing through the fill port from the adsorption cavity to the surrounding environment.

2. The audio speaker of claim 1 further comprising a hermetic seal along the outer edge between the permeable partition and the housing.

3. The audio speaker of claim 2, wherein the plurality of holes are configured to prevent the adsorptive filler from passing between the adsorption cavity and the rear cavity.

4. The audio speaker of claim 3, wherein the permeable partition includes a mesh having a plurality of strands, and wherein the holes are between the plurality of strands.

5. The audio speaker of claim 3, wherein the speaker driver includes a diaphragm that moves along a central axis, and wherein the rear cavity is directly behind the diaphragm along the central axis.

6. The audio speaker of claim 5, wherein the adsorption cavity is laterally offset from the rear cavity away from the central axis.

7. The audio speaker of claim 6, wherein a first side of the permeable partition faces the rear cavity in a direction orthogonal to the central axis.

8. The audio speaker of claim 5, wherein the adsorption cavity is directly behind the rear cavity along the central axis.

9. The audio speaker of claim 8, wherein a first side of the permeable partition faces the rear cavity in a direction parallel to the central axis.

10. The audio speaker of claim 5, wherein the adsorptive filler covers a portion of the housing within the adsorption cavity.

11. The audio speaker of claim 10, wherein the adsorptive filler substantially fills the adsorption cavity.

12. The audio speaker of claim 11, wherein the granules of the adsorptive filler are loose adsorbent particles.

13. The audio speaker of claim 12, wherein the loose adsorbent particles include one or more of a zeolite material or an activated carbon material.

14. A method, comprising:
molding a housing around an outer edge of a permeable partition, wherein molding the housing around the outer edge of the permeable partition includes sealing the outer edge of the permeable partition to the housing, wherein the housing defines a back volume, wherein the permeable partition divides the back volume into a rear cavity and an adsorption cavity and includes a plurality of holes that allow sound to propagate directly between the rear cavity and the adsorption cavity, wherein the plurality of holes have respective hole dimensions, and wherein the housing includes a driver port and a fill port, the fill port including a hole extending through the housing between the adsorption cavity and a surrounding environment;
mounting a speaker driver in the driver port such that the rear cavity is defined between the speaker driver, the housing, and the permeable partition, wherein the speaker driver is to convert an electrical audio signal into a sound, the sound to propagate through the gas in the back volume;
inserting an adsorptive filler into the adsorption cavity through the fill port to fill the adsorption cavity, wherein the adsorptive filler includes granules having respective outer dimensions greater than the respective hole dimensions such that the permeable partition constrains the granules within the adsorption cavity, and wherein the granules are movable against the permeable partition and the housing within the adsorption cavity; and
sealing the fill port with a plug such that the adsorption cavity is defined between the plug, the housing, and the permeable partition, wherein the plug includes a plug shape to form a press fit between a surface of the plug and the housing within the hole of the fill port to create a stopper that seals the adsorption cavity.

15. The method of claim 14 further comprising a hermetic seal along the outer edge between the permeable partition and the housing.

16. The method of claim 15, wherein the plurality of holes are configured to prevent the adsorptive filler from passing between the adsorption cavity and the rear cavity.

17. The method of claim 16, wherein the speaker driver includes a diaphragm that moves along a central axis, and wherein the rear cavity is directly behind the diaphragm along the central axis.

18. The method of claim 17, wherein inserting the adsorptive filler into the adsorption cavity includes coating a portion of the housing within the adsorption cavity with the adsorptive filler.

19. The audio speaker of claim 1, wherein the adsorptive filler fills at least 75% of a volume of the adsorption cavity, and wherein the adsorptive filler does not completely fill the volume.

20. The audio speaker of claim 1, wherein the housing is overmolded around the outer edge of the permeable partition such that the outer edge is in a slot of the housing to seal the outer edge to the housing.

21. The method of claim 14, wherein molding the housing includes overmolding the housing around the outer edge of the permeable partition such that the outer edge is in a slot of the housing to seal the outer edge to the housing.

\* \* \* \* \*